(12) United States Patent
Hart et al.

(10) Patent No.: US 8,817,756 B1
(45) Date of Patent: Aug. 26, 2014

(54) CHANNEL ASSIGNMENT AND SCHEDULING FOR CENTRALIZED CLUSTERING IN 60 GHZ WIRELESS NETWORKS

(75) Inventors: Brian Donald Hart, Sunnyvale, CA (US); Genyuan Wang, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 220 days.

(21) Appl. No.: 13/348,054

(22) Filed: Jan. 11, 2012

(51) Int. Cl.
*H04W 74/04* (2009.01)
*H04W 28/04* (2009.01)

(52) U.S. Cl.
USPC .......................... 370/337; 370/345; 370/442

(58) Field of Classification Search
CPC ..... H04W 80/04; H04W 88/06; H04W 28/04; H04W 72/04; H04W 72/0446; H04W 84/12; H04W 74/04; H04B 7/2643; H04B 7/2656; H04L 12/2801
USPC .................. 370/328, 329, 336, 337, 345, 442
See application file for complete search history.

(56) References Cited

U.S. PATENT DOCUMENTS

| 7,872,997 | B2 | 1/2011 | Qian | |
|---|---|---|---|---|
| 2011/0205998 | A1* | 8/2011 | Hart et al. | 370/330 |
| 2012/0082109 | A1* | 4/2012 | Hong et al. | 370/329 |

OTHER PUBLICATIONS

Morioka, et al., "802.11ad New Technique Proposal," IEEE 802.11-10/0259r02, Mar. 2010.
Yong, "60 GHz Technology for Gbps WLAN and WPAN: From Theory to Practice," pp. 1-16, John Wiley & Sons, Ltd., 2011.
Hiertz, et al., "A Decentralized Reservation Scheme for IEEE 802.11 Ad Hoc Networks," Personal, Indoor and Mobile Radio Communications, 2003.

* cited by examiner

*Primary Examiner* — Ronald Abelson
(74) *Attorney, Agent, or Firm* — Edell, Shapiro & Finnan, LLC

(57) ABSTRACT

Allocation schemes are provided for one or more portions of time during a data transmission time interval for contention by personal coordination points, access points and client devices to perform transmit sector sweep operations. In addition, a personal coordination point determines whether the set of channels universally agreed to be free by nearby synchronization access points is empty and selects any channel in the frequency band to initiate a Basic Service Set or continue operation of an existing Basic Service Set if it is determined that no channel in the frequency band is free among the channels that are universally agreed to be free.

21 Claims, 8 Drawing Sheets

CHANNEL ASSIGNMENT AND SCHEDULING FOR CENTRALIZED CLUSTERING IN 60 GHZ WIRELESS NETWORKS

TECHNICAL FIELD

The present disclosure relates to wireless networks.

BACKGROUND

In order to accommodate very high data rates in wireless local area networks, enhancements to existing standards, e.g., to the IEEE 802.11 wireless standard (also known commercially as WiFi™) are being developed. The enhancements are IEEE 802.11ac and 802.11ad. In addition, another specification, known as WiGig (for Wireless Gigabit) managed by the WiGig Alliance (WGA), is being developed for 60 Gigahertz (GHz) operation.

The WGA and 802.11ad proposals use a scheduled media access control (MAC) protocol whereby access to the frequency band is allocated in a scheduled manner. Nevertheless, overlapped scheduling can occur due to multiple Basic Service Sets within radio range of each other. Even if the Basic Service Sets offset their beacon transmissions and only take a fraction of the available medium time, clock offsets in the wireless devices still can cause regular transmissions, such as beacons, to drift and consequently overlap with each other. Overlapped scheduling can also occur if one scheduler allocates 95% of the medium time to its clients, and another overlapped scheduler does the same.

DESCRIPTION OF EXAMPLE EMBODIMENTS

Overview

According to one aspect, in a wireless network comprising a plurality of wireless synchronization access points that serve wireless client devices and also personal coordination points and wireless access points which in turn also serve wireless client devices, a data transmission time interval is allocated for transmission of data by personal coordination points, access points or client devices. One or more portions of the data transmission time interval are allocated for contention by personal coordination points, access points and client devices to perform transmit sector sweep operations. Information indicating occurrence (e.g., start time and duration) of the allocated one or more portions is sent by the controller apparatus to the plurality of wireless synchronization access points which send the information to member personal coordination points and member access points, which in turn send the information to their associated client devices.

According to another aspect, a personal coordination point or access point scans a frequency band and detects channel availability based on beacon and announce messages received from synchronization access points that respectively indicate channels in use by synchronization access points and channels available to personal coordination points and access points (that are not synchronization access points). If not all channels in the frequency band are determined to be in use from synchronization access point beacons and/or announce messages and the personal coordination point or access point (that is not a synchronization access point) is unwilling or unable to synchronize to an synchronization access point, then the personal coordination point or access point uses the available channels. If all channels in the band are determined to be unavailable, then the personal coordination point or access point (that is not a synchronization access point) selects any channel in the frequency band to initiate a basic service set or to continue operation of an existing basic service set.

Example Embodiments

Figure 1:
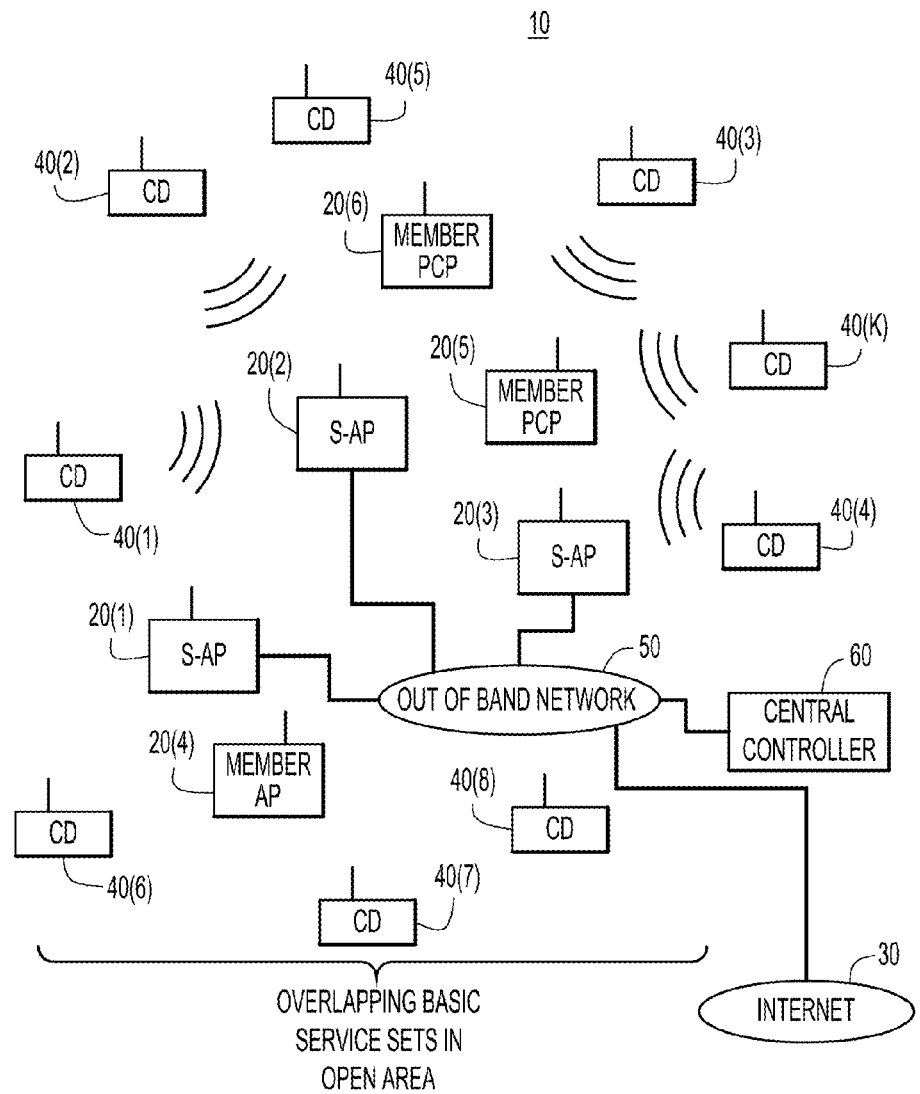
FIG. 1 is a system block diagram showing a plurality of wireless client devices each associated to one of a plurality of member wireless access points or personal coordination points which in turn each synchronize (cluster) to one of a plurality of wireless synchronization access points which in turn are each are controlled by a controller apparatus.

Referring first to FIG. 1, a block diagram is shown of a wireless network 10 deployed for 60 GHz operation with a high density of wireless client devices in a relatively open geographical environment with a relatively enclosed perimeter. For example, this network may operate in accordance with the IEEE 802.11ad amendment or the WGA specification. The network 10 comprises a plurality of synchronization wireless access points (S-APs) 20(1), 20(2) and 20(3), a plurality of member personal coordination points (member PCPs) and member APs, each of which communicates with one of the S-APs 20(1)-20(3). The S-APs 20(1)-20(3) each operate in a different basic service set (BSS). For example, there is a member AP 20(4) with respect to S-AP 20(1), a member PCP 20(5) with respect to S-AP 20(3) and a member PCP 20(6) with respect to S-AP 20(2). Thus, a PCP/AP that clusters to an S-AP is referred to as a "member PCP"/"member-AP" of that S-AP. There is a plurality of client devices (CDs) 40(1)-40(K), and subsets of the CDs are served by corresponding ones of the PCPs or APs 20(1)-20(N). The CDs 40(1)-40(K) communicate with corresponding ones of the S-APs 20(1)-20(3) or with appropriate ones of the member PCPs or member APs 20(4)-20(6). Thus, S-APs are assigned to channels in a frequency band, and PCPs and/or APs, by synchronizing to an S-AP, group themselves into a cluster served by an S-AP.

Said another way, a PCP or AP (PCP/AP), when it approaches an S-AP, can operate in one of several ways. It can cluster to the S-AP and thereby become a member PCP/member AP (still a PCP/AP but with the additional attribute of being a member of a cluster of a particular S-AP). Or, the PCP/AP can go to a different channel and remain an unclustered PCP/AP.

The S-APs 20(1)-20(3) are coupled to an out-of-band network 50, e.g., an Ethernet wired network or a wireless 2.4/5/60 GHz backhaul network, or some combination thereof, or the Internet. In addition, for the purposes of controlling the channel assignment and scheduling of transmissions, the S-APs 20(1)-20(3) communicate with a central controller 60 by way of the out-of-band network 50. The central controller 60 is configured to control the S-APs and thence the member APs, PCPs and finally the CDs. The member PCPs/member APs 20(4)-20(6) do not have out-of-band network connectivity to the central controller 60, but they communicate with CDs and other PCP/APs by sending beacons and coordinating transmissions as explained further hereinafter. It should be understood that the number of APs (e.g., 3 S-APs and 3 member PCPs/member APs) and CDs shown in FIG. 1 is only by way of example for simplicity. In an actual deployment, there would be many more S-APs and member PCPs and member APs.

In a 60 GHz wireless network, the stations (STAs) 20(1)-20(N) and 40(1)-40(K) use directional transmissions to steer beams due to the relatively short range of a 60 GHz transmission. IEEE terminology is used herein in which a "STA' can be any device, e.g., a CD, AP or PCP. To locate target APs that are in range and can service a CD, the CDs perform a transmit sector sweep (TXSS) operation by transmitting a beam in one direction and rotating the beam, for example, by 15 or 30 degrees. The CDs continue sweeping the beam until a complete or part of a circle is covered, thereby enabling PCP/APs to detect and optionally transmit to the CD using the best sector for the PCP/AP. Likewise, PCP/APs regularly perform a similar TXSS using Directional Band (DBand) Beacons so CDs can locate and optionally transmit to them. DBand involves transmissions typically sent in a directional fashion to improve range, contrasted with lower frequency bands where transmissions, especially Beacons, are more often sent omnidirectionally and still achieve reasonable range.

Figure 2:
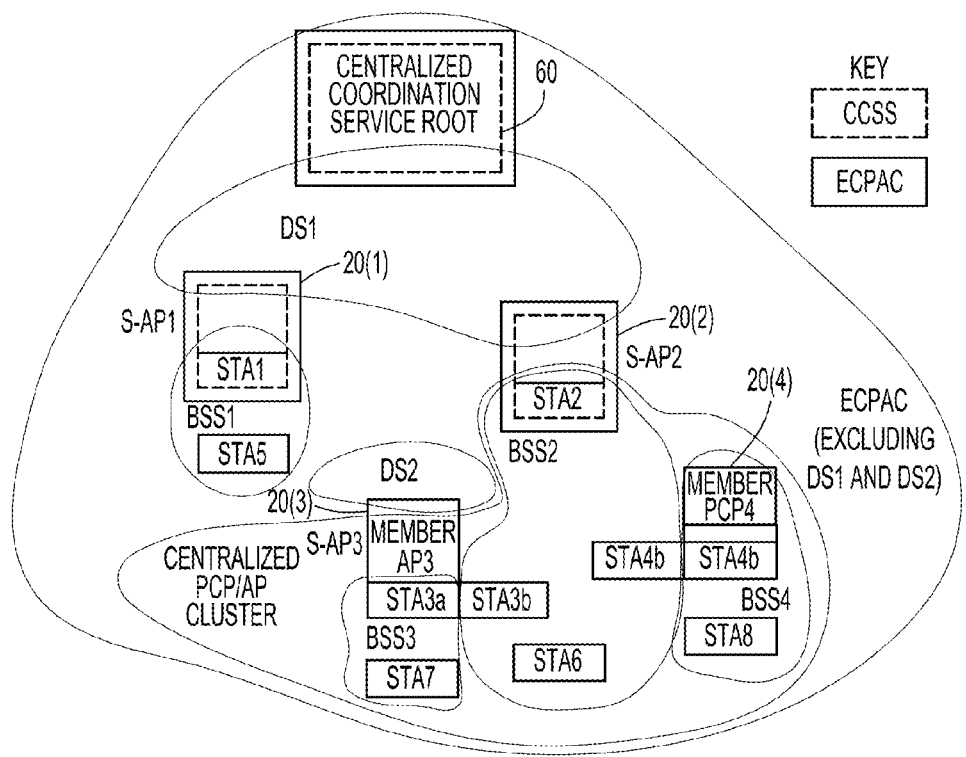
FIG. 2 is a diagram illustrating a centralized cluster arrangement of access points.

Reference is now made to FIG. 2. FIG. 2 shows a more detailed and pedantic example of a plurality of APs, PCPs and CDs organized in clusters. Under the IEEE terminology, a PCP or AP is a STA with respectively PCP or AP functionality added. The central controller 60 (FIG. 1) is referred to as a Centralized Coordination Service Root and it synchronizes and configures certain APs to operate as S-APs. Examples of S-APs are also shown in FIG. 2 at reference numbers 20(1) and 20(2), denoted S-AP1 and S-AP2, respectively. The combination of the Centralized Coordination Service Root and the S-APs is referred to as a Centralized Coordination Service Set (CCSS). In the diagram, DS refers to a distribution service, and is used, for instance, for connectivity between the S-APs and the Centralized Coordination Service Root or for intranet/Internet access by the S-APs and their associated clients (e.g. STA6). An example of the DS is an Ethernet network. There are also PCP/APs that may lack network access but still send DBand Beacons as coordinated transmissions, as described below in connection with FIG. 5. Neighboring PCP/APs that detect a Beacon from an S-AP are configured a) to cluster to those S-APs, or b) go to the guaranteed reserved channels, known a priori or advertised by a management message, not subject to clustering requirements. By contrast, PCP/APs that do not detect an S-AP are configured to do nothing further. A CCSS together with clustered PCPs/APs (i.e., member PCPs/member APs) and their clients are referred to as an Extended Centralized PCP/AP Cluster (EC-PAC). Outside FIG. 2 (e.g., in FIG. 1), AP 20(3) and PCP 20(4) are simply referred to as member PCPs/member APs, but in FIG. 2, APs 20(3) and 20(4) are meant to explicitly represent physical devices. AP 20(3) is made up of two logical STAs: i.e. STA3b and STA3a, where STA3a is augmented with AP functionality. AP 20(3) is a member of the cluster of S-AP 20(2), hence it is called a member AP. PCP 20(4) is made up of two logical STAs: i.e. STA4a and STA4b, where STA4b is augmented with PCP functionality. PCP 20(4) is a member of the cluster of S-AP 20(2), so it is called a member PCP. In FIG. 2, S-AP 20(1) is a synchronization AP, S-AP1 (containing STA functionality, labeled STA1), in BSS1 and BSS1 also includes STA5. Similarly. S-AP 20(2) is another synchronization AP, denoted S-AP2 (containing STA functionality, labeled STA2) in BSS2. BSS2 also includes STA3b, STA4b and STA6. The AP, AP3, within the physical device of member AP 20(3) in BSS3, also includes STA7. The PCP, PCP4, within the physical device member PCP 20(4) in BSS4 which also includes STA8. DS1 is the backhaul for BSS1. DS2 is the backhaul for BSS3 (which does not go anywhere: i.e. AP3 is an isolated AP). PCPs do not have DSs and so member PCP4 is not associated with a DS. Thus, there are 4 levels of devices: a) the CCSR, b) S-APs, c) member PCP/member APs and d) CDs. Although not shown explicitly in FIG. 2, the TXSS CBAPs are defined by the CCSR, then passed to S-APs and thence to member PCP/member APs and thence to CDs (or from S-APs to CDs).

Figure 3:
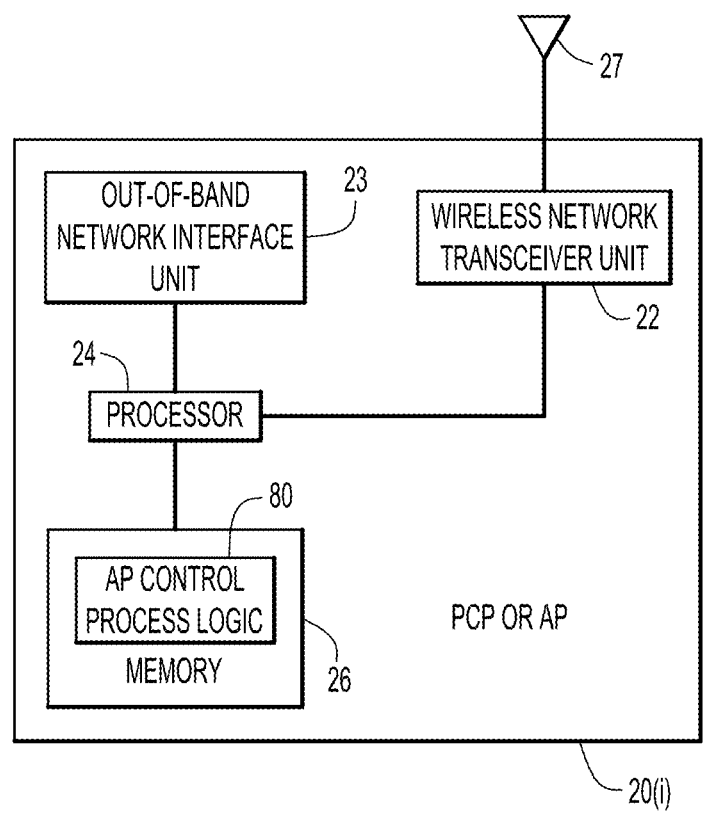
FIG. 3 is a block diagram of an example wireless personal coordination point or access point.

Turning now to FIG. 3, an example block diagram is shown of a PCP or AP (i.e. an S-AP, a member PCP, a member AP; or a PCP or AP without synchronization or membership functionality) configured to perform the operations described herein. The PCP/AP, generically identified by reference numeral 20(i), comprises a wireless network transceiver unit 22, an out-of-band network interface unit 23, and a memory 26. The wireless network transceiver unit 22 is coupled to at least one antenna 27 and is configured to perform the baseband modulation and demodulation as well as radio frequency (RF) processing for transmitting signals to CDs and receiving signals from CDs in accordance with an applicable wireless communication protocol, e.g., IEEE 802.11ad or the specification of the WGA, to serve CDs operating in the 60 GHz frequency band. The wireless network transceiver unit 22 may include one or more application specific integrated circuits configured to perform its operations. The out-of-band network interface unit 23 is configured to enable communication over the out-of-band network 50, which in the case of an Ethernet network, is an Ethernet card. If the out-of-band network 50 is a wireless network (different from the wireless network used for communicating with CDs), then the out-of-band network interface unit 23 is configured to perform wireless communications over the out-of-band network 50.

The processor 24 is, for example, a microprocessor or microcontroller, that controls operations of the PCP/AP 20(i). For example, the processor 24 executes instructions for the PCP/AP control process logic 80 stored in memory 26. Memory 24 may comprise read only memory (ROM), random access memory (RAM), magnetic disk storage media devices, optical storage media devices, flash memory devices, electrical, optical, or other physical/tangible memory storage devices. In general, the memory 24 may comprise one or more tangible (e.g., non-transitory) computer readable storage media (e.g., a memory device) encoded with software comprising computer executable instructions and when the software is executed (by the processor 24) it is operable to perform the operations described.

Figure 4:
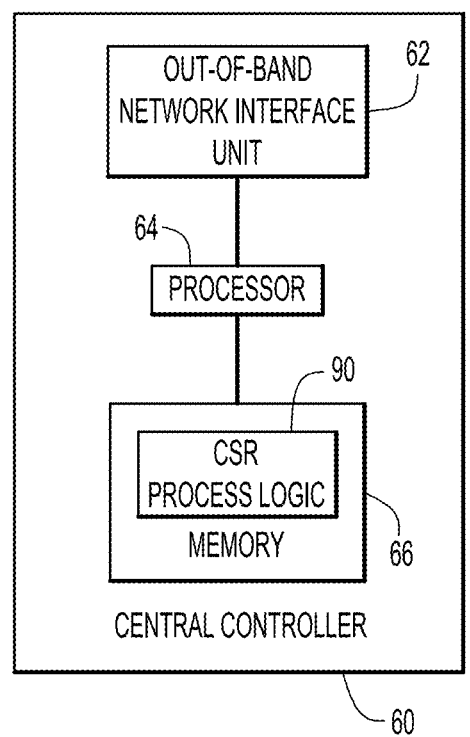
FIG. 4 is a block diagram of an example controller apparatus.

FIG. 4 illustrates an example of a block diagram of the central controller 60. In one example, the central controller 60 is a network device with computing capabilities. To this end, the central controller 60 comprises an out-of-band network interface unit 62, a processor 64 and memory 66. The central controller 60 may also comprise packet routing/switching units if it is involved in routing packets in the out-of-band network 50. The processor 64 controls operations of the central controller 60, and to this end, executes instructions for CSR process logic 90 stored in memory 66. The memory 66 may take the form of the memory 26 described above in connection with FIG. 3.

Figure 5:
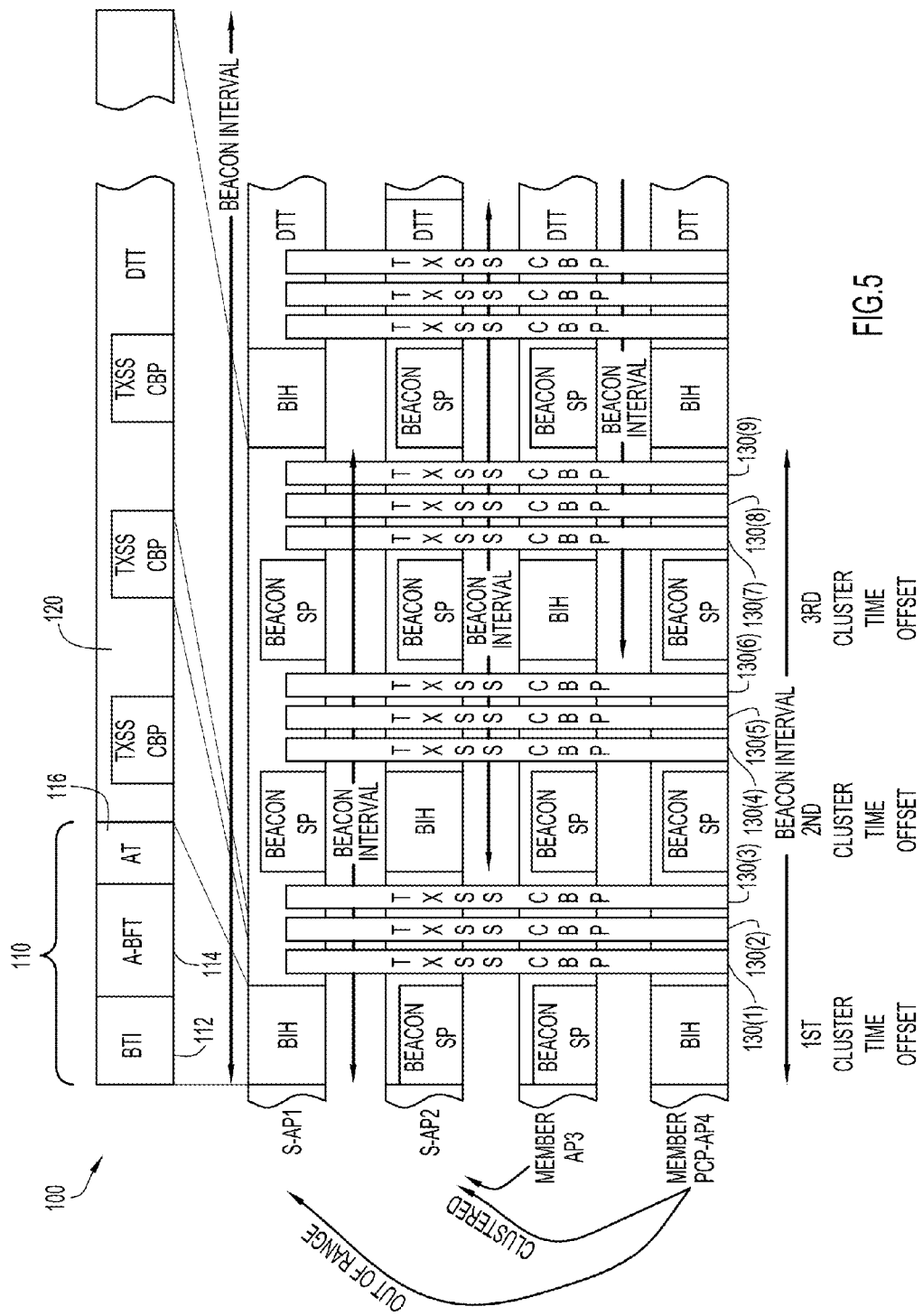
FIG. 5 is a timing diagram showing allocations of portions of a data transmission time interval for transmit sector sweep operations by access points or client devices.

Reference is now made to FIG. 5 that shows a timing diagram for signals transmitted according to the control techniques described herein. FIG. 5 shows a transmission structure 100 that is transmitted by each of the APs 20(1)-20(N). The structure 100 comprises a Beacon Interval Header (BIH) 110 and a Data Transfer Time (DTT) 120. The BIH 110 comprises a Beacon Time Interval (BTI) 112, an Adaptive Beamforming Time (A-BFT) 114, and an Announce Time (AT) 116.

One BIH plus one DTT is a Beacon Interval. The BIH 110 is offset at different APs, controlled by a Cluster Time Offset. With overlapped BSSs, to avoid beacon collisions, in an ECPAC, PCP/APs and/or BSSs that are in range of each other are scheduled to avoid each other by assigning nearby S-APs to different Cluster Time Offsets and member PCP/APs then select unused Cluster Time Offsets. Then, to ensure the sector sweep transmissions sent in the BTI and A-BFT do not affect overlapped BSSs, nearby S-APs and member PCPs/member APs allocate a Beacon Service Period to prevent data transmissions during the BIH of that PCP/AP, for each nearby PCP/AP. Thus, the DTT 120 continues through a Beacon SP. For example, as shown in FIG. 5, a BIH for S-AP1 is assigned to the first Cluster Time Offset, a BIH for S-AP2 is assigned to the second Cluster Time Offset, and AP3 selects the third Cluster Time Offset. Because, in this example, PCP/AP4 is out of range of S-AP1, it can select its BIH to the same Cluster Time Offset as S-AP1. Nearby member PCPs/member APs are advised of free Cluster Time Offsets by their S-AP.

During the DTT 120, several relatively short time intervals are reserved to accommodate TXSS Contention Based Allocation Periods (CBAPs). APs are allocated use of the BTIs 112 to perform the TXSS process so they can be located by STAs (especially CDs, but also, for example, STA3b in 20(3) or STA4b in 20(4) as shown in FIG. 2) and communications thereby optimized; and CDs are allocated use of the A-BFT 114 to perform the TXSS process so they can be located by APs and communications thereby optimized. If an AP or CD loses connectivity, either the AP or CD can perform the TXSS process during the DTT 120, but according to the techniques described herein, are confined to the TXSS CBAPs within the DTTs 120. In the example of FIG. 5, nine TXSS CBAPs 130(1)-130(9) are defined (by start and stop times, or start time and durations, or any equivalent thereto) within the DTT 120. The TXSS CBAPs are one or more common portions of time within the DTT 120 in which PCPs/APs and CDs can perform transmit sector sweep operations so as not to interfere with any data transmissions made during other portions of the DTT 120. Any CD and any AP can contend for and use a TXSS CBAP for performing the TXSS operation or sending data. Thus, all clusters share the same TXSS CBAPs and as a result, TXSS operations invoked by any CD, PCP or AP can occur during these TXSS CBAPs do not impact any data transmitted by a PCP, AP or CD outside those short time intervals within a DTT. The TXSS CBAPs serve as universal periods for TXSSs. As a variation, the individual TXSS CBAPs can be assigned to individual clusters so that only APs or CDs within a given cluster contend for TXSS CBAPs assigned to that cluster, thereby isolating the TXSS CBAPs for different clusters from each other. The TXSS CBAPs are defined by the CCSR, e.g., the central controller, then passed to S-APs, and then to member PCP/member APs and then to CDs (or CDs directly from an S-AP if associated directly to an S-AP).

As a result of the additional allocated time periods (TXSS CBAPs) for TXSS operations during the DTT 120, interference by TXSSing over data transmissions during the DTT is avoided because all devices will be informed of the time durations and occurrence of the TXSS CBAPs. The time during the DTT 120 when the TXSS CBAPs are not allocated will allow for transmissions unaffected by any TXSS operations by a PCP/AP or a CD. This is particularly useful in a dense environment in a relatively open area, e.g., a building with a "sea" of open desks or cubes with embedded offices, open lecture theaters, etc., where the PCP/APs serve overlapping basic service sets (OBSSs).

The following summarizes the control mechanisms depicted by FIG. 5, and with reference to FIG. 2. When in range of an S-AP within a CCSS, a PCP/AP either joins the S-APs centralized PCP/AP cluster or goes to a free channel (as advertised by the S-AP such as using the Channel Usage procedures of IEEE 802.11v or known a priori as channel 2). A PCP/AP selects an unused Cluster Time Offset if one is advertised by its S-AP. If mandated by an S-AP, a PCP/AP respects the BIH. The PCP/AP completes its own BTI, A-BFT and AT within the Beacon SP duration. Beacon SPs for Cluster Time Offsets in use are reserved so neighboring BSSs do not use them, as illustrated in FIG. 5. If mandated by an S-AP (and potentially echoed by a PCP/AP), CDs respect the TXSS CBAPs by completing any TXSSing within the TXSS CBAPs.

Figure 6:
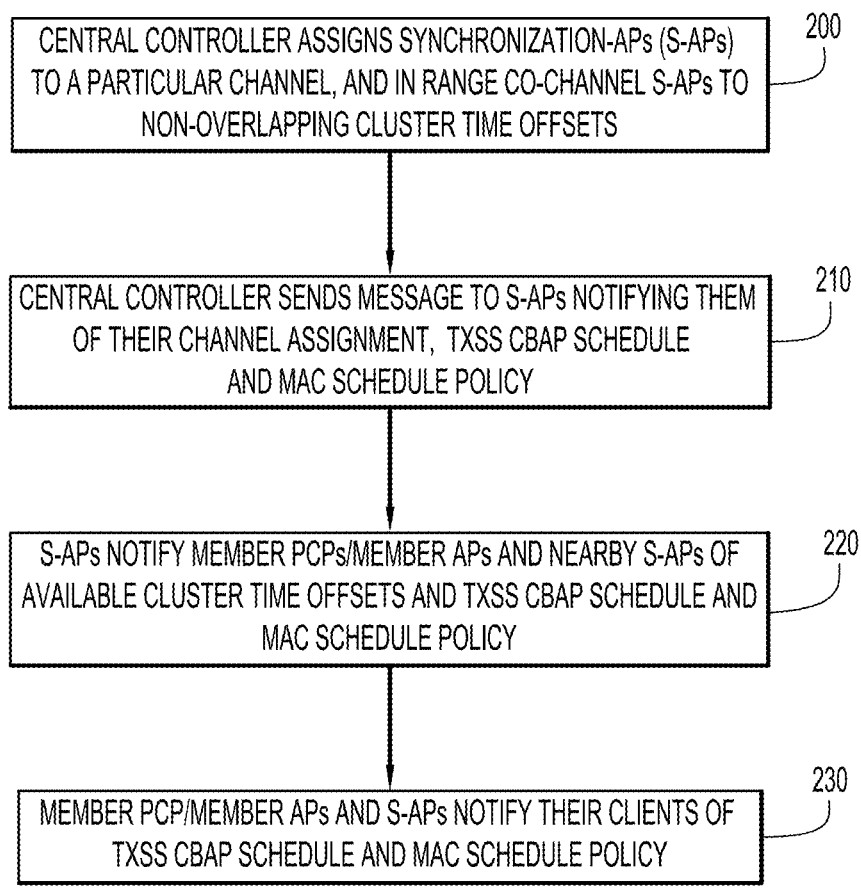
FIG. 6 is a flow chart depicting operations associated with disseminating control information from the controller apparatus to synchronization access points and then to member personal coordination points and member access points and then to client devices, about the MAC schedule policy and the allocated portions of the data transmission time interval for transmit sector sweep operations by personal coordination points, access points or client devices.

Reference is now made to FIG. 6 for a description of a flow chart depicting the dissemination of control information from the central controller 50, e.g., CCSR, down to the CDs about allocated portions of a data transmission time interval for TXSS operations by PCPs, APs or CDs. At 200, the central controller assigns S-APs to a particular channel (or range of channels from which the S-AP selects a particular channel) and in range co-channel S-APs to non-overlapping Cluster Time Offsets, so that they will transmit BIHs during contention-free Beacon SPs. At 210, the central controller sends a control message to the S-APs notifying them of their channel assignment, TXSS CBAP schedule and MAC schedule policy. The MAC policy indicates whether completing the BIH within the Beacon SP duration is mandatory or not, whether not performing TXSSs outside TXSS CBAPs while within the DTT is mandatory or not, and whether setting up a DBand Protected Period for every Beacon SP is mandatory or not. A DBand Protected Period involves the use of listening for Request-to-Send (RTS)/DBand Clear-to-Send (CTS) before a Service Period (SP) to ensure there is not an overlapped SP, and if not, then regularly sending a RTS/DBand CTS during a SP to prevent other devices from transmitting during its SP. (Service Period in this context is a period of time typically allocated to two STAs so they can exchange data. A Beacon Service Period is a special usage of the Service Period where nothing in the BSS is allowed to transmit, so as to avoid creating interference with an overlapped BSS's BIH.) Thus, S-APs receive from the central controller information that assigns individual one or more portions allocated during the DTT so that only APs, PCPs or CDs within a cluster contend for a particular portion to perform transmit sector sweep operations.

At 220, the S-APs notify nearby member PCPs/member APs and S-APs of available Cluster Time Offsets, the TXSS CBAP schedule (start time and duration, or start time and end time of TXSS CBAPs or equivalent) and MAC schedule policy. PCP/APs and/or APs reserve a Beacon SP within their data transmission time interval for contention-free use by nearby PCP/APs and/or APs based on cluster assignment so that PCP/APs, APs and CDs for other BSSs within range of, for example, a first BSS, do not transmit during the Beacon SP of the first BSS. At 230, member PCP/member APs and S-APs notify their CDs of TXSS CBAP schedule and MAC policy. Said another way, at 230, the member PCP/member APs and S-APs send to their associated CDs messages to notify them about the one or more portions of the data transmission time interval (i.e. DTT) allocated for contention by APs and CDs to perform TXSS operations.

Figure 7:
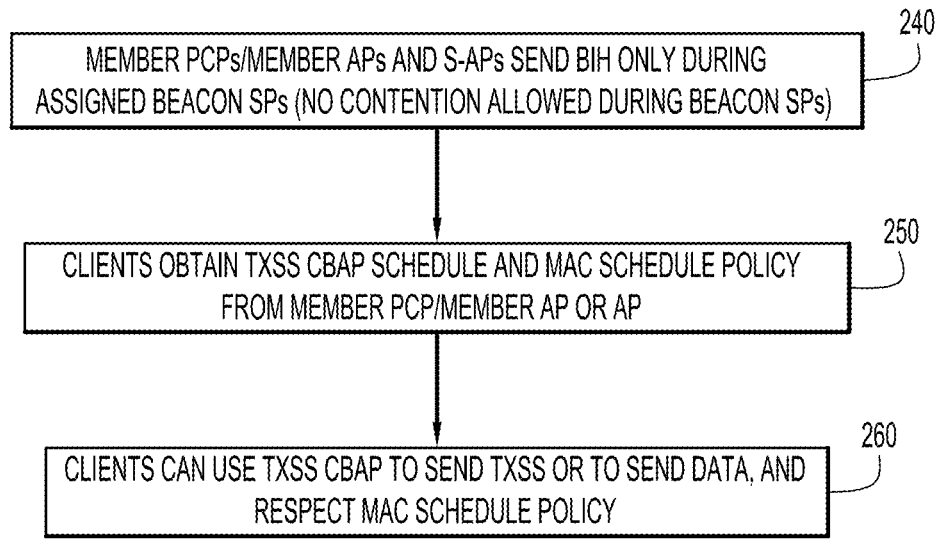
FIG. 7 is a flow chart depicting operations performed by synchronization access points, member personal coordination points, member access points and client devices based on the disseminated control information.

FIG. 7 illustrates a flow chart that depicts operations of the PCPs, APs and CDs based on the control information disseminated as explained above. At 240, the member PCP/member APs and S-APs send BIHs at their assigned Cluster Time Offsets and establish Beacon SPs for overlapped BSSs such that no contention is allowed during BIHs. At 250, CDs obtain the TXSS CBAP schedule and MAC schedule policy from a PCP/AP or S-AP (from operation 220 in FIG. 6). At 260, CDs or PCP/APs confine their TXSS operations to (or may send data during) the TXSS CBAPs, and respect the MAC policy at all times. In this way, a CD or AP can contend for use of a TXSS CBAP to perform a TXSS operation or to send data without interfering with data sent during the remainder of the DTT as shown in FIG. 5. As explained above, certain TXSS CBAPs may be assigned specifically to a particular cluster so that contention for a TXSS CBAP is limited to APs or CDs within a particular cluster.

According to another aspect, the central controller, in assigning channels to S-APs, always leaves one or more particular channels available. PCP/APs (that are not S-APs) can always go to (i.e., use) one of these channels. In the situation in which a free channel does not occur, it is an error condition or an indication of a Denial-Of-Service attack on the PCP/AP (that is not an S-AP). As a result, when a PCP/AP (that is not an S-AP) scans channels and determines that there are S-APs operating on every channel or the combination of channel usage fields from different S-APs indicates that no channel is universally agreed to be available, then the PCP/AP (that is not an S-AP) can ignore this and select a channel to make a transmission.

Figure 8:
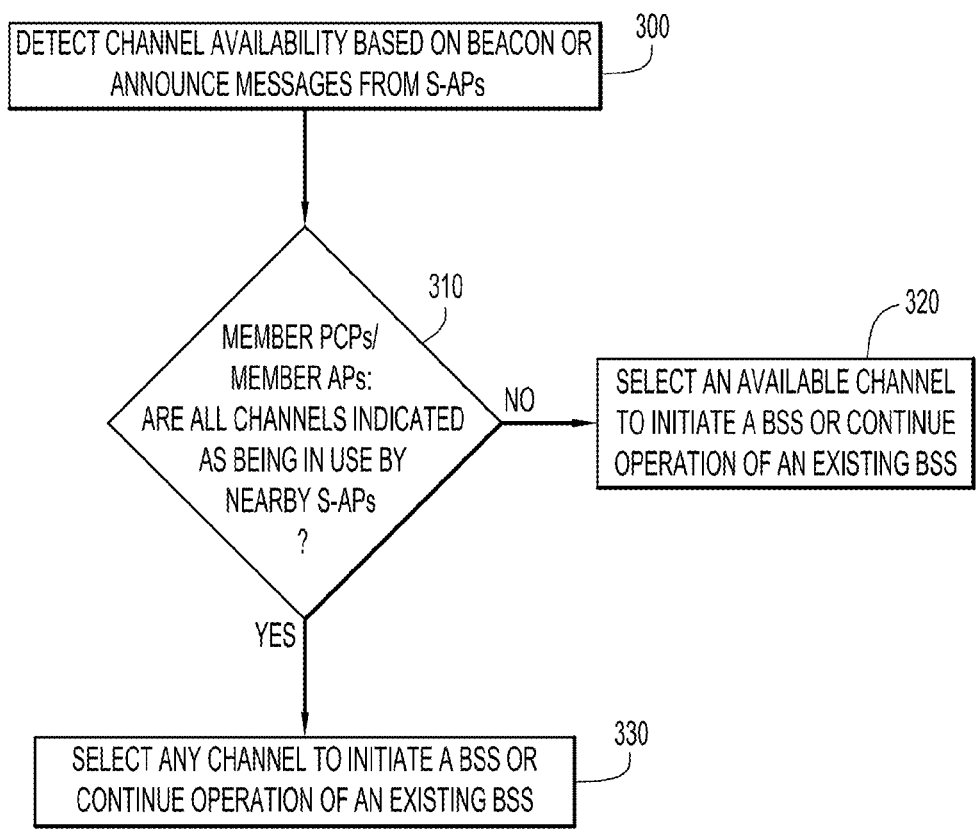
FIG. 8 is a flow chart depicting operations performed by a personal coordination point or access point device when attempting to initiate a Basic Service Set or continue operation of an existing Basic Service Set.

FIG. 8 illustrates an example of a flow chart that depicts operations performed by a PCP/AP (that is not an S-AP) when attempting to find an available channel to make a transmission. Each S-AP transmits DBand Beacons indicating which channel is in use by the S-AP. As well, an S-AP sends an Announce message in response to an inquiry by the PCP/AP (that is not an S-AP) that indicates which channels are free from S-APs in this ECPAC. At 300, a PCP/AP (that is not an S-AP) or AP detects channel availability based on the DBand Beacons and Announce messages received from the S-APs. At 310, the PCP/AP (that is not an S-AP) determines whether all channels are indicated as being in use by nearby S-APs. In other words, at 310, it is determined whether a set of channels universally agreed to be free is empty based on the received DBand Beacons and Announce messages. If the PCP/AP (that is not an S-AP) finds that there is at least one channel not in use, then at 320, the PCP/AP (that is not an S-AP) selects one of those channels to initiate a BSS, or to continue operation of its existing BSS. On the other hand, if the PCP/AP (that is not an S-AP) receives Announce or Beacon messages from a plurality of APs indicating that there is no universally agreed unused channels, then at 330, the PCP/AP (that is not an S-AP) is configured to ignore this situation and to select any channel to initiate a BSS, or to continue operation of its existing BSS. That is, at 330, any channel in the frequency band is selected (to initiate a BSS or continue operation of a BSS) when it is determined that no channel in the frequency band is free among the channels that are universally agreed to be free. Also at 330, the PCP/AP (that is not an S-AP) reports the results of this determination to its CDs (e.g. via a Channel Switch Announcement frame).

In summary, the operations depicted by the flow chart of FIG. 8 are as follows. A PCP or AP operating in a wireless network scans a frequency band and detects channel availability based on Beacons and Announce messages sent by S-APs that indicate channel usage by the S-APs. The PCP or AP determines whether a set of channels universally agreed to be free is empty based on received Beacons and Announce messages, and selects any channel in the frequency band to initiate a basic service set or to continue operation of a basic service set when it is determined that no channel in the frequency band is free among the channels that are universally agreed to be free.

The above description is intended by way of example only.

What is claimed is:

1. A method comprising:
    at a controller apparatus that communicates with a plurality of synchronization access points in a wireless network, wherein each of the synchronization access points has a respective cluster of member devices, has network connectivity to the controller, and is configured to serve wireless client devices, member personal coordination points and member access points within its respective cluster, and in which member access points in turn are configured to serve wireless client devices in the wireless network, during a data transmission time interval allocated for transmission of data by access points or client devices, allocating one or more portions of the data transmission time interval for contention by personal coordination points, access points and client devices to perform transmit sector sweep operations;
    sending to the plurality of synchronization wireless access points a message indicating occurrence of the one or more portions of the data transmission time interval; and
    assigning synchronization access points to channels in a frequency band, wherein personal coordination points and access points group themselves into a cluster served by a synchronization access point.

2. The method of claim 1, and further comprising personal coordination points or access points reserving a Beacon service period within their data transmission time interval for contention-free use by nearby personal coordination points or access points based on cluster assignment so that personal coordination points, access points and client devices in other basic service sets within range of a first basic service set do not transmit during the Beacon service period of the first basic service set.

3. The method of claim 2, and further comprising assigning individual one or more portions allocated during the data transmission time interval so that only personal coordination points, access points or client devices within a cluster within a basic service set contend for a particular portion to perform transmit sector sweep operations.

4. The method of claim 1, and further comprising a personal coordination point, access point or a client device performing transmit sector sweep operations during one or more portions of time within the data transmission time interval so as not to interfere with any data transmissions made during other portions of the data transmission time interval.

5. The method of claim 1, and further comprising an access point or client device performing a data transmission during one or more portions of time within the data transmission time intervals.

6. The method of claim 1, and further comprising one or more of the plurality of synchronization access points sending to member personal coordination points and member access points messages to notify them about a media access control policy and the one or more portions of the data transmission time interval allocated for contention by access points and client devices to perform transmit sector sweep operations.

7. The method of claim 6, and further comprising the member personal coordination points and member access points sending to their associated client devices messages to notify them about the media access control policy and the one or more portions of the data transmission time interval allocated for contention by access points and client devices to perform transmit sector sweep operations.

8. A method comprising:
at a wireless synchronization access point apparatus that has a cluster of member devices, has network connectivity to the controller, and that serves wireless client devices and also member personal coordination points and member access points which in turn also serve wireless client devices in a wireless network, receiving from a control apparatus a message indicating occurrence of one or more portions of the data transmission time interval that are to be allocated for contention by access points and client devices to perform transmit sector sweep operations;
sending to the member personal coordination points and member access points a message indicating the occurrence of the one or more portions of the data transmission time interval; and
receiving from the control apparatus information assigning synchronization access points to channels in a frequency band, to which personal coordination points and access points organize into clusters, each cluster having a single synchronization access point.

9. The method of claim 8, and further comprising personal coordination points or access points reserving a Beacon service period within their data transmission time interval for contention-free use by nearby personal coordination points or access points based on cluster assignment so that personal coordination points, access points and client devices in other basic service sets within range of a first basic service set do not transmit during the Beacon service period of the first basic service set.

10. The method of claim 9, and further comprising receiving from the control apparatus information that assigns individual one or more portions allocated during the data transmission time interval so that only access points, personal coordination points or client devices within a cluster contend for a particular portion to perform transmit sector sweep operations.

11. A method comprising:
at a wireless personal coordination point or access point operating in a wireless network, scanning a frequency band and detecting channel availability based on beacons and announce messages sent by synchronization access points that have network connectivity to a controller that indicate channel usage by the synchronization access points;
determining, based on received beacons and announce messages, whether a set of channels are not in use by devices operating in the wireless network; and
selecting any channel in the frequency band to initiate a basic service set or to continue operation of a basic service set when it is determined that no channel in the frequency band is not in use by devices operating in the wireless network.

12. The method of claim 11, and further comprising selecting a channel that is determined to be available to initiate a basic service set or to continue operation of a basic service set.

13. The method of claim 12, wherein scanning comprises scanning a frequency band in the 60 GHz range.

14. An apparatus comprising:
a network interface unit configured to enable communications over a network that is out of a band of a wireless network in which a plurality of synchronization wireless access points each have a cluster of associated member devices, network connectivity to a network interface unit, and serve wireless client devices, member personal coordination points and member wireless access points within respective clusters of synchronization access points, and in which member access points in turn also serve wireless client devices in the wireless network, wherein the network interface unit enables communication with the plurality of synchronization wireless access points;
a processor coupled to the network interface unit and configured to:
during a data transmission time interval allocated for transmission of data by access points or client devices, allocate one or more portions of the data transmission time interval for contention by personal coordination points, access points and client devices to perform transmit sector sweep operations;
generate a message to be sent to the plurality of synchronization wireless access points, the message indicating occurrence of the one or more portions of the data transmission time interval; and
assign synchronization access points to channels in a frequency band.

15. The apparatus of claim 14, wherein the processor is configured to assign individual one or more portions allocated during the data transmission time interval so that only personal coordination points, access points or client devices within a cluster contend for a particular portion to perform transmit sector sweep operations.

16. One or more tangible computer readable storage media storing instructions that, when executed by a processor, are operable to:
at a controller apparatus that communicates with a plurality of synchronization access points in a wireless network, wherein each of the synchronization access points has a respective cluster of member devices, has network connectivity to the controller apparatus, and is configured to serve wireless client devices, member personal coordination points and member access points within its respective cluster, and in which member access points in turn are configured to serve wireless client devices in the wireless network, during a data transmission time interval allocated for transmission of data by access points or client devices, generate data to allocate one or more portions of the data transmission time interval for contention by personal coordination points, access points and client devices to perform transmit sector sweep operations;

generate a message to be sent to a plurality of synchronization wireless access points, the message indicating occurrence of the one or more portions of the data transmission time interval; and assign synchronization access points to channels in a frequency band.

17. The tangible computer readable storage media of claim 16, and further comprising instructions operable to assign individual one or more portions allocated during the data transmission time interval so that only personal coordination points, access points or client devices within a cluster contend for a particular portion to perform transmit sector sweep operations.

18. An apparatus comprising:
a wireless transceiver unit configured to transmit signal and receive signals in a wireless network; and
a processor coupled to the wireless transceiver unit and configured to:
    scan a frequency band to detect channel availability based on beacons and announce messages sent by synchronization access points having network connectivity to a controller that indicate channel usage by the synchronization access points;
    determine, based on received beacons and announce messages, whether a set of channels are not in use by devices operating in the wireless network; and
    select any channel in the frequency band to initiate a basic service set or to continue operation of a basic service set when it is determined that no channel in the frequency band is are not in use by devices operating in the wireless network.

19. The apparatus of claim 18, wherein the processor is further configured to select a channel that is determined to be available to initiate a basic service set or to continue operation of a basic service set.

20. A method comprising:
at a controller apparatus that communicates with a plurality of synchronization access points in a wireless network, wherein each of the synchronization access points has a respective cluster of member devices, has network connectivity to the controller, and is configured to serve wireless client devices, member personal coordination points and member access points within its respective cluster, and in which member access points in turn are configured to serve wireless client devices in the wireless network, during a data transmission time interval allocated for transmission of data by access points or client devices, allocating one or more portions of the data transmission time interval for contention by personal coordination points, access points and client devices to perform transmit sector sweep operations;

sending to the plurality of synchronization wireless access points a message indicating occurrence of the one or more portions of the data transmission time interval; and one or more of the plurality of synchronization access points sending to member personal coordination points and member access points messages to notify them about a media access control policy and the one or more portions of the data transmission time interval allocated for contention by access points and client devices to perform transmit sector sweep operations.

21. The method of claim 20, and further comprising the member personal coordination points and member access points sending to their associated client devices messages to notify them about the media access control policy and the one or more portions of the data transmission time interval allocated for contention by access points and client devices to perform transmit sector sweep operations.

* * * * *